Sept. 4, 1923.                                                1,467,202
E. SLATINEANU
PROCESS OF AND APPARATUS FOR SEPARATING PLATINUM FROM
PLATINIFEROUS METERIALS
Filed Feb. 26, 1921
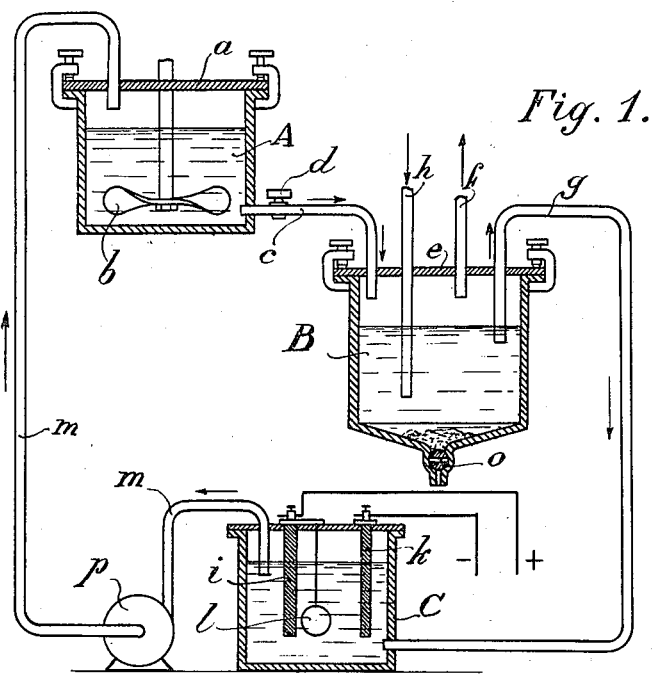
Fig. 1.
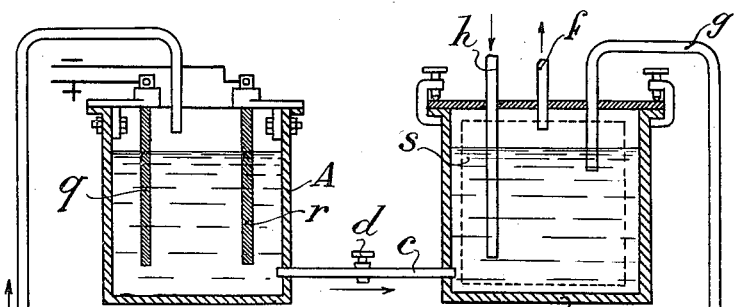
Fig. 2.
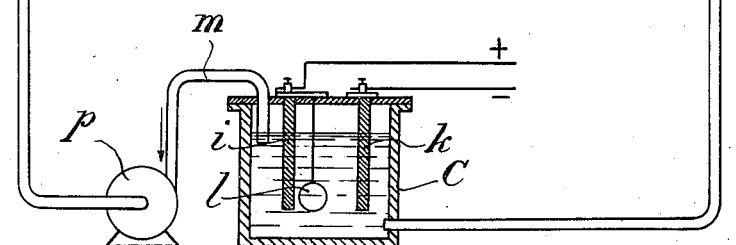
Inventor
Eulampiu Slatineanu
by [signature]
his attys Patented Sept. 4, 1923.

1,467,202

UNITED STATES PATENT OFFICE.

EULAMPIU SLATINEANU, OF CRESSY-ONEX, NEAR GENEVA, SWITZERLAND.

PROCESS OF AND APPARATUS FOR SEPARATING PLATINUM FROM PLATINIFEROUS MATERIALS.

Application filed February 26, 1921. Serial No. 448,009.

*To all whom it may concern:*

Be it known that I, EULAMPIU SLATINEANU, chemist, a subject of the King of Rumania, residing at Cressy-Onex, near Geneva, in the Confederation of Switzerland, have invented certain new and useful Improvements in Processes of and Apparatus for Separating Platinum from Platiniferous Materials, of which the following is a specification.

The present invention has for its object an electrolytic process and apparatus for the separation of platinum from other metals such as silver, gold, palladium and iridium, lead, etc., contained in platiniferous sludges and ingots. According to this process I precipitate, in a solution containing gold, palladium and platinum, the gold and the palladium completely, so as to obtain a pure platinum solution from which the platinum is extracted by electrolysis.

To prepare the initial solution containing the different rare metals which are to be separated from each other I may dissolve in weak aqua regia kept at a temperature of about 70° C. platinum ingots or sludges resulting for example from a recovery of silver by electrolysis from a nitric solution prepared with impure gold, these sludges containing platinum, gold and sometimes iridium, palladium and more or less lead.

I may also utilize as an anode an ingot of impure gold containing silver, platinum, palladium, iridium, rhodium, ruthenium, etc., and submit it to electrolysis in an electrolyte composed of a solution of auric chloride acidulated with hydrochloric acid. The silver passes in the form of insoluble chloride into the residual anodic sludge and the Pt, the Pd and the Au of the anode dissolve.

To precipitate the gold and the platinum from their solution, I may employ the reducing action of hydrogen previously submitted to the influence of ultraviolet rays. For this purpose I cause the hydrogen thus treated to pass into or bubble through the said solution.

I may also submit the solution of gold, palladium, and platinum firstly to electrolysis in order to eliminate first a portion of the gold so as to obtain a fixed relationship between the gold, the platinum and the palladium in the solution before submitting it to the hydrogen acted on by the ultraviolet rays, so as not to precipitate the platinum and the other metals with the gold. This relationship must not exceed for example the following values:

3% of Au, 6% of Pt, and 0.5% of Pd.

To still further facilitate the precipitation of the gold and palladium by the hydrogen acted on I may place in the receptacle, in which this precipitation takes place, a plate or sheet of metal for example of gold or platinum. A voltaic action takes place in the couple H/Au or H/Pt by the action of which the gold and the platinum are deposited on this plate or sheet and may be easily removed therefrom.

For the extraction of the platinum by electrolysis from the aqua regia platinum solution it is advantageous to expose the anode to the influence of the ultraviolet rays so as to act on the chlorine which develops there and fix it to the hydrogen of the water to form hydrochloric acid, the oxygen being combined with the nitrous vapours for forming nitric acid. In this way I can regenerate the aqua regia and this can be brought to the starting point and serve for the solution of a fresh quantity of impure gold so that it forms a closed cycle.

The installation for putting this process into practice comprises at least three tanks one of which serves for the solution of the crude metal, the second for the precipitation of the gold and the palladium and the third for the electrolysis of the platinum solution. These three tanks are connected to each other so as to form a closed cycle.

The accompanying drawing represents by way of example and diagrammatically two constructional forms of this installation.

In Figure 1, A is a tank called the dissolving tank made of a material which is not attacked by aqua regia, such for example as gutta percha, glass, slate, etc. This tank is closed hermetically by means of a cover $a$ through which passes the shaft of an agitator $b$ which can be worked by any kind of apparatus. The tank A is connected by means of a pipe $c$ provided with a cock $d$ to a tank B called the precipitating tank. This tank is likewise closed by a cover $e$ and made of some material which is not attacked by aqua regia. The pipe $c$ passes through the cover through which also pass three other pipes, one of which $h$ descends to nearly the bottom of the tank and serves to convey the hydrogen previously submitted to the action of the ultraviolet rays. The second one $f$ is intended for the outlet of the hydrogen. The third one $g$ reaches as far as the upper third of the tank and connects the latter to a tank C and is utilized for the flow of the liquid from the tank B into the tank C. This latter tank C is also of a material which is not attacked by aqua regia, but is open and contains two electrodes $i$ and $k$ in the form of plates of pure retort carbon. Between these two electrodes and in proximity to the anode is a quartz mercury vapour lamp $l$. The tank C is connected to the tank A by means of a pipe $m$ in which is interposed a pump $p$.

To separate the platinum from the other metals by means of the installation above described I proceed in the following manner:—

The cock $d$ being closed I introduce into the tank A weak aqua regia then either the ingot reduced to small pieces and containing silver, platinum, iridium, palladium, gold and perhaps lead, or sludges whch are left after electrolysis of silver and which may contain the same metals plus silver as chloride. The tank is closed by means of the cover $e$ and the liquid is heated to 70° C. by an electrical resistance or any other means of heating, the agitator being rotated the while. The aqua regia dissolves the platinum, the palladium and the gold, while the lead, the chloride of silver and the iridium remain insoluble and form a sludge which deposits at the bottom of the tank. By opening the cock $d$ the solution is caused to pass through the pipe $c$ into the tank B which it fills to the extent of two thirds and hydrogen previously submitted to the influence of ultraviolet rays (which rays may be emitted by a quartz mercury vapour lamp) is admitted by the pipe $h$. This lamp which is not represented in the drawing, may be surrounded by a coil of quartz in which the hydrogen circulates, as is described in my prior specification Serial No. 426,413. I may also utilize any other means for influencing the hydrogen by the ultraviolet rays. This hydrogen bubbles through the solution of aqua regia and by reason of its powerful reducing action the gold and the palladium are precipitated quantitatively while the platinum remains in solution. The deposit of Au and Pd collect at the bottom of the tank and may be removed therefrom by the valve $o$ the two metals being easily separable from each other subsequently. The excess of hydrogen returns through the pipe $f$ to the gas holder which provided it. The solution containing only chloride of platinum is conveyed by the pipe $g$ into the electrolytic tank and is subjected to electrolysis without it being necessary to heat it. The current employed is advantageously one of 4.8 to 9 Amp per $dm^2$ of electrode surface. The platinum is deposited in the form of sponge on the cathode $k$ which may be slightly paraffined so as to facilitate the removal of platinum by scraping. The chlorine passes to the anode $i$ and, under the action of the ultraviolet rays emitted by the lamp $l$ decomposes the water of the solution, giving hydrochloric acid (HCl) and oxygen (O) which comes off and oxidizes the nitrous vapours in order to regenerate nitric acid ($HNO_3$). In this way there is at least in theory no loss of hydrochloric acid nor of nitric acid. The aqua regia is automatically regenerated. In practice it is however advantageous to add from time to time a little nitric acid. By means of the pump $p$ the aqua regia is brought back by the pipe $m$ to the tank A, in which it can be made to serve again to dissolve a fresh quantity of ingots or auriferous or platiniferous sludge.

In the second constructional form of the installation shown in Figure 2, the tank A is open and contains two electrodes $p$ and $r$. The anode $q$ is formed of impure gold containing silver, platinum, palladium, iridium, rhodium and ruthenium, the four last metals in very small quantities. The cathode is of pure gold. The precipitating tank B is similar to that shown in Figure 1 but contains also a plate or sheet $s$ of gold or of platinum intended to serve as a support for the precipitate of gold and palladium. The tank B communicates by means of the pipe $g$ with the tank C which, in its turn, is connected to the tank A by the pipe $m$.

The working of the process in this installation is as follows:—

The electrolyte in the tank A is formed by a hot solution of about 70° C. of auric chloride acidulated with hydrochloric acid. A current of from 5 to 9 amperes per $dm^2$ of electrode surface is caused to pass. The silver contained in the anode $q$ is deposited in the state of insoluble chloride in the residual anodic sludge; the gold of the anode is transported to the cathode $k$, where it is precipitated and the platinum and the palladium of the anode dissolve and remain in the solution because they precipitate with more difficulty than the gold at the cathode. The other rare metals such as iridium, rhodium, etc., do not dissolve but remain at the anode.

The electrolyte may be allowed to enrich itself up to a certain concentration of platinum and palladium without these metals being precipitated at the cathode.

During this time the cock $d$ remains closed. There comes a moment when the composition of the electrolyte approaches the following limit: 30 gr. of gold, 60 gr. of platinum and 5 gr. of palladium per litre. When this limit is arrived at it is necessary to withdraw the solution for electrolysis and cause it to pass into the tank B by opening the cock $d$ as otherwise the platinum and the palladium would decompose with the gold at the cathode.

In the tank B the electrolyte is brought into the presence of hydrogen influenced by ultraviolet rays and forming with the plate *s* a voltaic couple H/Au. The voltaic action of this couple facilitates the precipitation of the gold and of the palladium, this precipitation taking place in this instance on the metal plate. The platinum alone remains in solution which is conducted by the pipe *g* into the tank C where it undergoes electrolysis. As has been described for Figure 1 the chlorine which is produced at the anode *i* combines under the action of the ultraviolet rays emitted by the lamp *l* with the hydrogen of the water to set free the oxygen. A part of this oxygen is carried along with the liquid by the pump *p* and brought into the tank A in which it facilitates the solution of the gold in the hydrochloric acid.

Instead of hydrochloric acid I may also employ in this case a weak solution of aqua regia. Instead of plunging the lamp *l* into the bath this may be placed outside the tank C and illuminate the anode *i* through a window made in the wall of the tank.

When ingots of impure gold are used I may also treat the ingot by the nitric acid which dissolves the silver which is electrolyzed directly. The other metals (Pb, Au, Pt, Ir, etc.) remain in the sludge. These are recovered and treated according to one or other of the modifications of the process described.

What I claim and desire to secure by Letters Patent of the United States is:—

1. The process of separating platinum from platiniferous materials consisting in subjecting hydrogen to the influence of ultra-violet rays, introducing the hydrogen thus treated to a solution containing gold, palladium, and platinum to precipitate the gold and palladium, and then extracting the platinum by electrolysis.

2. The process of separating platinum from platiniferous materials consisting in first subjecting a solution of gold, palladium and platinum to electrolysis for eliminating a part of the gold to obtain a fixed relationship between the gold and the platinum, subjecting hydrogen to the influence of ultra-violet rays, and then introducing the hydrogen to the solution to precipitate the gold and palladium and then extracting the platinum by electrolysis.

3. The process of separating platinum from platiniferous materials consisting in subjecting a solution containing gold, palladium and platinum to obtain a fixed relationship between the gold and the platinum in the solution, then subjecting hydrogen to the influence of ultraviolet rays, then introducing the hydrogen thus treated to the said solution in the presence of a voltaic couple to precipitate the gold and palladium, and then subjecting the solution to electrolysis to extract the platinum.

4. The process of separating platinum from platiniferous materials consisting in subjecting a solution containing gold, palladium and platinum to obtain a fixed relationship between the gold and the platinum in the solution, then subjecting hydrogen to the influence of ultraviolet rays, then introducing the hydrogen thus treated to the said solution in the presence of a voltaic couple composed of hydrogen and a sheet of gold to precipitate the gold and palladium, and then subjecting the solution to electrolysis to extract the platinum.

5. The process of separating platinum from platiniferous materials consisting in dissolving gold, palladium and platinum in aqua regia, precipitating the gold and palladium from the aqua regia gold, palladium and platinum solution, and then subjecting the aqua regia platinum solution to electrolysis to extract the platinum.

6. The process of separating platinum from platiniferous materials consisting in dissolving gold, palladium and platinum in aqua regia, precipitating the gold and palladium from the aqua regia gold, palladium and platinum solution by introducing hydrogen which has been subjected to the influence of ultra-violet rays, and then subjecting the aqua regia platinum solution to electrolysis to extract the platinum.

7. The process of separating platinum from platiniferous materials consisting in dissolving gold, palladium and platinum in aqua regia, precipitating the gold and palladium from the aqua regia gold, palladium and platinum solution by introducing hydrogen which has been subjected to the influence of ultra-violet rays, then subjecting the aqua regia platinum solution to electrolysis to extract the platinum, and then exposing the anode which extends into the aqua regia platinum solution to the influence of ultra-violet rays to act on the chlorine there evolved and to associate it with the hydrogen of the water which it decomposes to form hydrochloric acid, the oxygen of the water combining with nitrous vapors to form nitric acid therein regenerating an aqua regia solution.

8. An apparatus for the separation of platinum from platiniferous materials consisting of three tanks, in the first of which ingots or sludges are dissolved, a pipe connection making communication between the first tank and the second tank, means for introducing gas into the second tank, the pipe connection making communication between the second tank and the third tank, and means for conveying a liquid in the third tank to the first tank.

9. An apparatus for the separation of platinum from platiniferous materials comprising a plurality of tanks, in the first of which ingots or sludges are dissolved, a pipe connection making communication between the first and the second tank, means for introducing hydrogen into the second tank, a metal plate also in the second tank forming with the hydrogen as introduced therein a voltaic couple, a pipe connection making communication between the second tank and the third tank, and means for conveying a solution from the third tank to the first tank.

10. An apparatus for the separation of platinum from platiniferous materials comprising a plurality of tanks, in the first of which ingots or sludges are dissolved, a pipe connection making communication between the first and the second tank, means for introducing hydrogen into the second tank, a metal plate also in the second tank forming with the hydrogen as introduced therein a voltaic couple, a pipe connection making communication between the second tank and the third tank, anode and cathode plates connected to the third tank, and means for conveying a solution from the third tank to the first tank.

11. An apparatus for the separation of platinum from platiniferous materials comprising a plurality of tanks, in the first of which ingots or sludges are dissolved, a pipe connection making communication between the first and the second tank, means for introducing hydrogen into the second tank, a metal plate also in the second tank forming with the hydrogen as introduced therein a voltaic couple, a pipe connection making communication between the second tank and the third tank, anode and cathode plates connected to the third tank, a vapor lamp in the third tank in proximity to the said anode, and means for conveying a solution from the third tank to the first tank.

In testimony whereof I have affixed my signature in presence of two witnesses.

EULAMPIU SLATINEANU.

Witnesses:
ROD. DE WURSTEMBERGER,
MAURICE NUER.